US005484529A

United States Patent [19]
Malugade et al.

[11] Patent Number: 5,484,529
[45] Date of Patent: Jan. 16, 1996

[54] BAG FILTER SYSTEM WITH MULTIFILTER ADAPTABILITY

[75] Inventors: Dilip Malugade, Oostburg; Mark A. Wessel, Sheboygan, both of Wis.

[73] Assignee: Ametek, Inc., Plymouth Products Division, Sheboygan, Wis.

[21] Appl. No.: 268,206

[22] Filed: Jun. 29, 1994

[51] Int. Cl.⁶ .................................................. B01D 29/27
[52] U.S. Cl. .......................... 210/448; 210/450; 210/452; 210/453; 210/497.01; 55/373; 55/376; 55/379
[58] Field of Search .................................... 210/448, 452, 210/453, 455, 451, 497.01, 450; 55/361, 372, 373, 376, 379

[56] References Cited

U.S. PATENT DOCUMENTS

| | | | |
|---|---|---|---|
| 3,631,987 | 1/1972 | Cattano, Sr. | 210/452 |
| 4,204,966 | 5/1980 | Morgan, Jr. | 210/448 |
| 4,285,814 | 8/1981 | Morgan, Jr. | |
| 4,669,167 | 6/1987 | Asterlin | |
| 4,701,259 | 10/1987 | Rosaen | 210/452 |
| 5,045,194 | 9/1991 | Gershenson | 210/452 |
| 5,137,632 | 8/1992 | Morgan, Jr. | |

FOREIGN PATENT DOCUMENTS 730217  8/1932  France .

*Primary Examiner*—Robert A. Dawson
*Assistant Examiner*—W. L. Walker
*Attorney, Agent, or Firm*—Andrus, Sceales, Starke & Sawall

[57] ABSTRACT

A bag filter assembly utilizing a conventional housing and end cap construction includes a unique filter bag retaining cage and end cap adaptor which allow the use of replaceable bag filter elements of widely varying construction. The assembly will accommodate bag filter elements of the type having a shape retaining opening of rigid construction and including a shape-retaining bottom end cap or of the type comprising a generally continuous flexible tubular sleeve. The system is tolerant of the latter type of bag filters of substantially varying thicknesses.

11 Claims, 2 Drawing Sheets

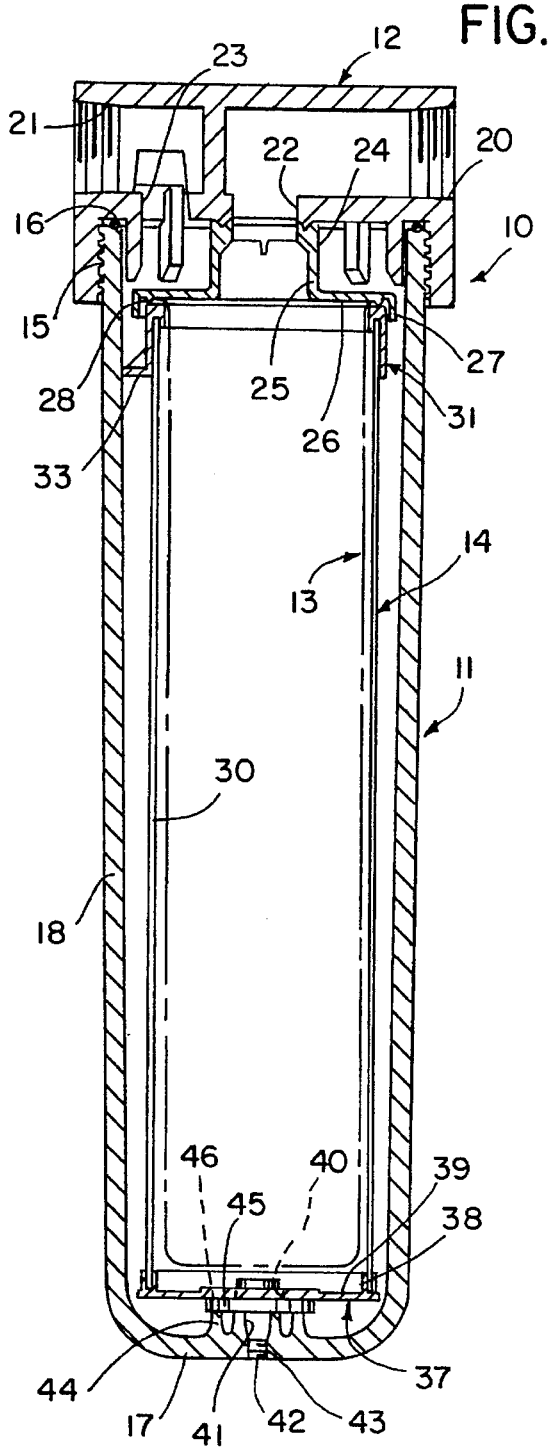
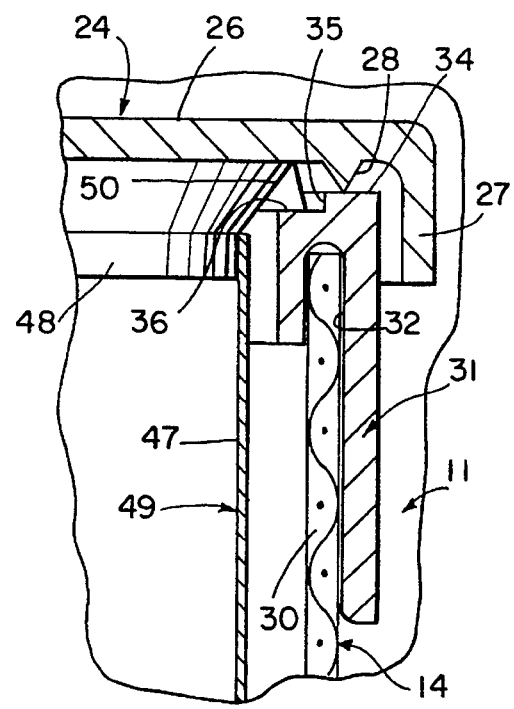
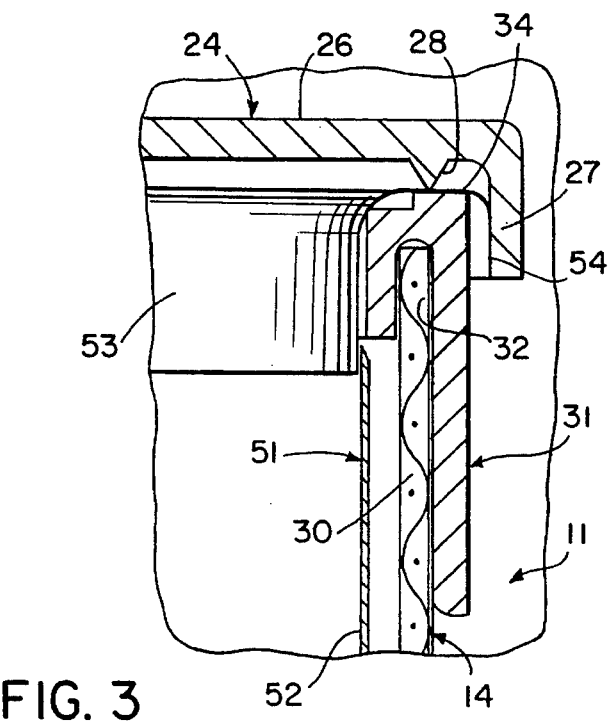
FIG. 1
FIG. 2
FIG. 3

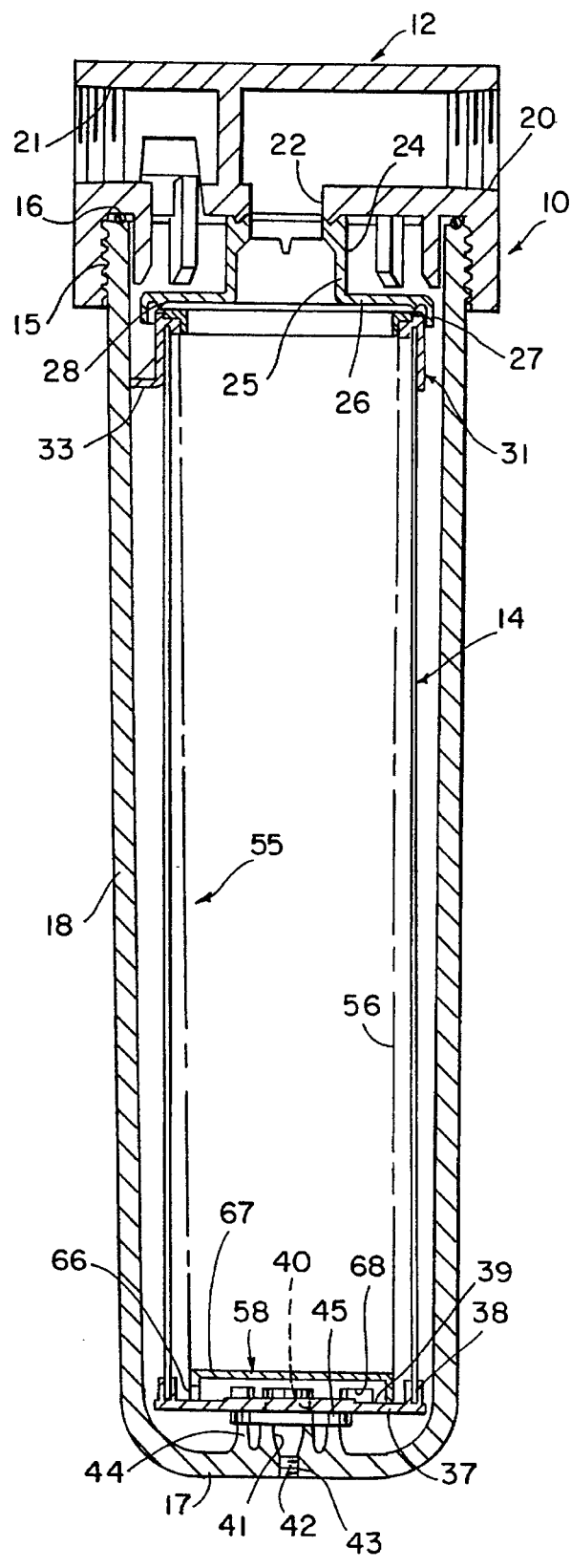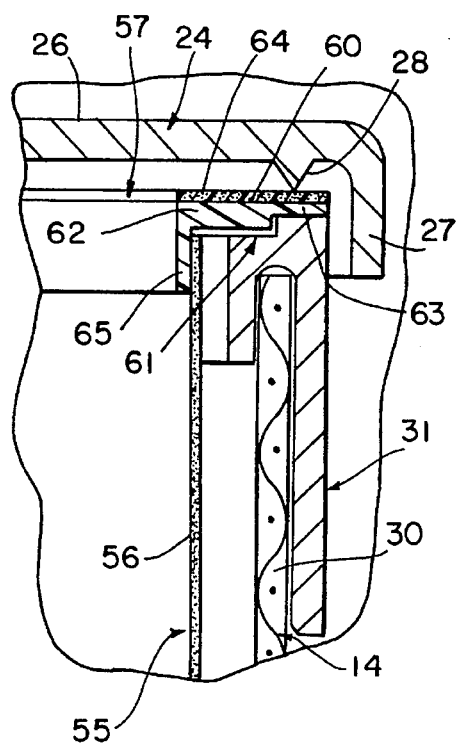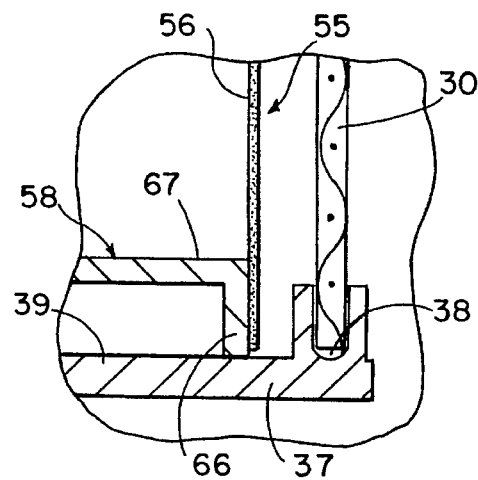

BAG FILTER SYSTEM WITH MULTIFILTER ADAPTABILITY

BACKGROUND OF THE INVENTION

The present invention pertains to a filter system in which a replaceable bag filter is enclosed in a tubular housing with a removable end cap and, more particularly, to such a system which is adaptable to accommodate a wide range of bag filter constructions without any changes in the construction of the housing and end cap.

Replaceable bag filters and systems utilizing them are well known in the art. Such filter systems are applied to filter a wide variety of liquids including inks, paints, and alcoholic beverages including beer and wine. Typically, such a filter system includes an open ended tubular housing and an enclosing end cap. A replaceable filter bag is placed within the housing and the peripheral edge of its open upper end is sealed as the cap is replaced on the housing. The cloth-like filter bag is typically supported in the housing within an open mesh tubular basket or cage which is also typically suspended within the housing.

One well known filter bag construction is shown in various embodiments in U.S. Pat. Nos. 4,285,814; 4,669,167; and 5,137,632. This filter bag includes conventional flexible cloth-like filter media attached to an impervious plastic collar which defines the open end of the bag. The peripheral edge of the collar is defined by an annular lip having the shape of an inverted V and various constructions of housings and end caps are specifically designed to mount and seal filter bags having this construction. However, these housings and end caps cannot be used with any other type of filter bag.

Filter bags are also available which do not have the unique collar and V-shaped lip characteristic of the constructions shown in the foregoing patents. Such bag filters may have a flexible annular end sleeve defining the opening of the bag which may be a flexible cloth of somewhat heavier or lighter construction than the bag filter media itself, or simply an extension of the filter bag.

All of the foregoing types of bag filters are available in the replacement market, but the user is typically restricted to a single type for which the housing and end cap, and possibly the retaining cage, were specifically constructed. Another problem common to all bag filters is that their fairly light weight construction and high flexibility often make them difficult to insert into the retaining cage or basket without wrinkling and collapsing.

It would, therefore, be most desirable to have a bag filter system in which the housing, end cap and bag-retaining cage could be utilized with different types of commonly available replaceable filter bags. Further, an improved filter bag construction which facilitates replacement would also be desirable.

SUMMARY OF THE INVENTION

In accordance with the present invention, a housing, end cap, and cage or basket for a filter system are uniquely constructed to accommodate many of the presently available filter bags, including those with unique shape-retaining openings, flexible heavy cloth end sleeves, or open ends which are merely continuations of the bag filter media itself. Sealing means are provided for holding the tubular cage between the bottom of the housing and the end cap, which sealing means includes a compressible lower end seal between an annular lower end of the cage and the bottom of the housing, and an upper end seal between an annular upper end of the cage and the end cap. The upper end seal and end cap are operative upon attachment of the end cap on the housing to capture and seal the open end of the bag filter along the annular upper end of the cage.

Preferably, the annular upper end of the cage includes a flat annular sealing surface and the end cap includes a sharp-edged annular sealing ring which operatively engages the sealing surface upon end cap closure. When utilizing a bag filter of the type having a flexible annular end sleeve, the sleeve is draped over the annular upper end of the cage and captured between the sealing surface and the sealing ring. A filter bag having a unique rigid annular lip includes a thin annular peripheral edge which is similarly captured between the end cap sealing ring and the sealing surface at the upper end of the cage. When utilizing a bag filter having an end collar with an inverted V-shaped lip, the annular upper end of the cage is provided with a downwardly stepped shoulder that defines an annular supporting surface radially inwardly of the sealing surface and, upon end cap closure, the inverted V-shaped lip is captured between the supporting surface and the end cap. The annular sealing ring preferably comprises a V-shaped bead.

One embodiment of a filter bag includes a rigid annular lower end cap, which is impervious and rests directly on the bottom of the cage.

In the preferred construction, the bottom of the tubular housing includes integral annular rib means disposed coaxially within the housing, the lower end of the cage is provided with a lower annular sealing surface, and the compressible lower end seal comprises a rubber ring between the annular rib means and the lower annular sealing surface. Preferably, the end cap includes an annular downwardly depending skirt radially outside the sealing ring which is adapted to shroud a portion of the end sleeve which lies outside the cage when that style of filter bag is utilized.

BRIEF DESCRIPTION OF THE DRAWINGS

FIG. 1 is a vertical section through a filter system of the present invention.

FIG. 2 is an enlarged detail of a portion of FIG. 1 showing use of the invention with one type of bag filter.

FIG. 3 is an enlarged detail of the same portion of FIG. 1 showing use of the invention with another type of bag filter.

FIG. 4 is a vertical sectional view similar to FIG. 1 showing the new filter bag construction of the present invention.

FIG. 5 is an enlarged detail of a portion of FIG. 4 showing the installation of the upper end of the filter bag.

FIG. 6 is an enlarged detail of a portion of FIG. 4 showing the installation of the lower end of the new filter bag.

DETAILED DESCRIPTION OF THE PREFERRED EMBODIMENT

The filter system 10 of the present invention includes an open ended tubular housing 11, a removable end cap 12, a bag filter element 13, and a porous basket or cage 14 enclosing and supporting the bag filter within the housing. One type of filter material commonly used for bag filter elements 13 is a non-woven needled polypropylene felt. The housing 11 and end cap 12 have complimentary patterns of threads 15, whereby the cap may be threaded onto the housing to enclose and seal the bag filter 13 therein. A suitable O-ring seal 16 is typically provided at the interface between the upper edge of the housing and the inside of the end cap, as shown.

The housing includes a bottom end wall 17 and an integral generally cylindrical side wall 18 terminating in the threaded upper end. The end cap 12 includes a raw water inlet 20 and a filtered water outlet 21. The inlet 20 communicates with a downwardly opening center passage 22 which directs the incoming raw water downwardly into the bag filter 13. The water passes through the bag filter media which removes the particulate materials from the water, and the filtered water flows upwardly along the interior of the side wall 18 of the housing through a side passage 23 in the end cap in communication with the filtered water outlet 21.

The end cap 12 thus far described is of conventional construction, as is the housing 11. To adapt the end cap 12 for use in the system of the subject invention, a cap adaptor 24 is attached to the interior of the cap axially around the center passage 22. As shown in FIG. 1, the adaptor 24 includes an open cylindrical collar 25 by which it is attached to the end cap, an annular surface 26 extending radially outwardly from the collar, and an outer cylindrical skirt 27 depending downwardly from the outer edge of the annular surface. The underside of the annular surface 26 is provided with a V-bead sealing ring 28 positioned radially inwardly of and concentric with the cylindrical skirt 27. The cap adaptor 24 may be attached to the end cap by any suitable means, including spin welding, ultrasonic welding, solvent bonding, adhesives or the like. Alternately, the adaptor could be formed integrally as part of a one piece end cap.

The basket or cage 14 for the bag filter element 13 comprises a separate element which is inserted into the housing 11 and the bag filter 13 is then inserted into the cage. Closure of the housing, by threading the end cap onto it, secures the cage and bag filter in position and provides a fluid tight seal between the underside of the cap adaptor 24 and the upper end of the cage 14.

The body of the cage 14 comprises a rigid and stiff cylindrical screen 30 which may be made of metal, plastic, or any other suitable material. The screen 30 has a substantially open construction and acts to hold the bag filter 13 in place, but provides virtually no restriction to the flow of water or other liquid being filtered. The upper end of the cage 14 is provided with an upper annular retainer 31 which includes a circumferential slot 32 into which the upper end of the cylindrical screen 30 is inserted and sealed in place. The outer cylindrical surface of the annular retainer 31 extends downwardly along the outside of the upper portion of the screen 30 and has a series of circumferentially spaced centering tabs 33 extending outwardly to engage the inner surface of the housing side wall 18 to help retain the cage in axially centered position in use. The upper face of the annular retainer 31 includes a flat annular sealing surface 34 which is adapted to be operatively engaged by the edge of the V-bead sealing ring 28 when the end cap is threaded onto the housing. A shoulder 35 inwardly of the sealing surface 34 defines an annular supporting surface 36, the function of which will be defined hereinafter.

The lower end of the cage 14 includes a lower annular retainer 37 defining a circumferential slot 38 within which the lower end of the cylindrical screen 30 is sealingly secured. The main body of the lower annular retainer 37 is generally disk-shaped and includes a flat bottom wall 39 having a central opening 40 adapted to receive therethrough an upstanding drain opening sleeve 41. The sleeve 41 forms part of the housing end wall 17 and defining a lower drain opening 42 therein, ordinarily sealed with a suitable threaded plug 43. Sleeve 41 also cooperates with the central opening 40 in the end retainer to center the cage 14 within the housing 11. A concentric annular rib 44 surrounds the drain opening sleeve 41 and a flexible rubber sealing ring 45 is positioned around the sleeve 41 and interposed between the annular rib and the underside of the annular retainer 37. The sealing ring 45 may be received in a shallow circular central recess 46 formed in the underside of the retainer 37.

Referring also to FIG. 2, the bag filter element 49 is of the type described in the above identified U.S. patents. It includes a tubular sleeve of filter media which typically comprises a woven cloth of natural or synthetic fibers. The open upper end of the tubular filter media 47 is secured to a relatively stiff, but flexible, shape retaining collar 48 which includes at its upper edge the characteristic inverted V-shaped annular lip 50.

When this type of bag filter 49 is inserted into the cage 14, it is supported by the edge of the lip 50 resting on the annular supporting surface 36 at the upper end of the cage. When the end cap is threaded onto the housing to close and seal the unit, the inverted V-shaped lip 50 is captured between the underside of the cap adaptor 24 and the annular supporting surface 36. The components are preferably sized such that a slight amount of flattening of the V-shaped lip takes place before the edge of the V-bead sealing ring 28 engages the sealing surface 34 on the upper end of the cage 14. However, because the seals which are created between the edges of the V-shaped lip, the V-bead ring and the respective surfaces which they engage are the result of line contact between relatively rigid surfaces, both of which are ordinarily made of plastic, it has been found difficult to provide a seal capable of sealing against the passage of particles smaller than about 100 microns. Nevertheless, the system utilizing the bag filter 49 may still be adequate to perform straining functions to remove particles greater than about 100 microns from liquids.

Referring to FIG. 3, the filter system 10 is shown utilizing a bag filter 51 of a different construction. This bag filter includes a tubular filter media 52 which may be similar or even identical to the cloth filter media 47 used with filter bag 49. The open upper edge of tubular filter media 52 includes a flexible annular end sleeve 53 which may be made of a variety of materials of varying thicknesses. Thus, the end sleeve 53 may simply be a continuation of the tubular filter media 52, or it may be a separate cloth sleeve of a totally dissimilar material. The cloth sleeve 53 may be of the same thickness as the tubular media 52, or may be substantially thinner or substantially thicker than the media. If of a different material, the sleeve is suitably secured to the tubular filter media and is long enough in the axial direction such that, after the tubular filter media 52 is inserted into the cage, the sleeve 53 may be draped over the upper end of the cage 14. Specifically, as shown, the sleeve is draped over the upper end of the upper annular retainer 31 including the annular supporting surface 36 and sealing surface 34 formed thereon. Thus, the free edge 54 of the sleeve 53 lies on the outside of the cage 14 and is preferably shrouded by the cylindrical skirt 27 depending downwardly from the outer edge of the cap adaptor 24. In this manner, the upward flow of filtered water along the inside wall of the housing 11 will not be obstructed by movement of the end of the sleeve into the flow path.

With the bag filter 51 inserted in the cage and the upper end sleeve 53 draped over the upper edge of the cage, the end cap 12 is threaded onto the housing 11 and the sleeve 53 is captured between the edge of the V-bead sealing ring 28 and the sealing surface 34. Because the thickness of the material forming the end sleeve 53 may vary considerably, it is important that the lower rubber sealing ring 45 have enough flexibility to compensate for an additional axially downward movement of the cage required by a thicker end sleeve material. Preferably, the construction of the filter assembly should be able to accommodate sleeve thicknesses in bag filters 15 ranging from about 0.015 to 0.085 inches, which range substantially covers the thicknesses of bags currently available.

It should also be noted that by providing a generous range of flexibility in the lower rubber sealing ring 45, a larger range of tolerance variations in the axial length of the cage 14 may be accommodated. Similarly, variations in the axial length of the cap adaptor 24 may also be conveniently accommodated. Also, the V-bead sealing ring 28 could be reversed and formed on the sealing surface 34. In this embodiment, the upwardly pointing sealing edge could operatively engage the flat underside of the surface 26.

Referring now to FIGS. 4–6, a unique new bag filter element 55 is shown, which element can be used with the same housing 11, end cap 12 and retaining cage 14 as the bag filter elements 13 and 51 previously described. The filter media 56 used in bag filter 55 may be the same material, such as a needled polypropylene felt. However, rather than including an integral enclosing lower end in the form of a sock, like the previously described filter elements, the filter media 56 is of a generally cylindrical tubular shape which extends between a fairly rigid shape-retaining open upper lip 57 and a rigid annular lower end cap 58.

Referring particularly to FIG. 5, the upper end of the filter element 55 has a shape-retaining lip 57 of flange-like construction, including a flat annular upper surface 60 and a stepped annular lower surface 61, which together define a rigid inner portion 62 adapted to rest on the annular supporting surface 36 and an annular outer peripheral edge portion 63 which is captured between the annular sealing surface 34 and the V-bead sealing ring 28. The stepped construction of the retaining lip 57 and the corresponding stepped construction of the upper end of the annular retainer 31 on the cage 14 cooperate to center and help seat the filter element on the cage when the former is inserted into the latter. Preferably, an annular gasket 64 is attached to the flat annular upper surface 60 of the lip to provide an enhanced flexible sealing surface for the V-bead sealing ring 28. Preferably, the gasket 64 is secured to the flat surface 60 by heat sealing, heat staking or a similar method. The upper lip 57 of the filter element 55 includes an integral downwardly depending sleeve 65 which is sonically welded to the upper end of the cylindrical filter media 56.

Referring also to FIG. 6, the lower end of the cylindrical filter media 56 is closed by the lower annular end cap 58 which includes a downwardly depending cylindrical lip 66 and an integral flat circular floor 67. The lower end of the filter media 56 is sonically welded to the cylindrical lip 66. It is important that the filter element 55 is manufactured to hold a tolerance in its axial length which will assure that, when the upper lip 57 is seated on the annular supporting surface 36, the lower edge of the downwardly depending lip 66 on the opposite end of the element is seated directly on the flat bottom wall 39 at the bottom of the cage 14. If the filter element 55 is made too short, so that the lower end cap 58 does not seat on the lower annular retainer 37, as indicated, the relatively delicate filter media 56 could be stretched and weakened or even ruptured, such as by a sudden surge in the inflow of water through the inlet 20 into the interior of the filter element.

The downwardly depending cylindrical lip 66 on the lower end cap 58 is preferably provided with a series of circumferentially spaced slotted openings 68 which may be of any convenient shape, such as the rectangular shape shown. The openings 68 have been found to enhance the speed at which the housing may be drained of liquid when the threaded plug 43 is removed to open the drain sleeve 41.

Various modes of carrying out the present invention are contemplated as being within the scope of the following claims particularly pointing out and distinctly claiming the subject matter which is regarded as the invention.

We claim:

1. In a filter system including a tubular housing and a removable and recloseable end cap for enclosing a replaceable tubular bag filter, which bag filter includes an open upper end defined by one of a rigid annular shape-retaining lip and a flexible annular end sleeve, and including a rigid foraminous tubular cage supported in the housing for enclosing and supporting the filter bag, said cage having annular upper and lower ends, the improvement comprising:

sealing means for holding the tubular cage between the bottom of the housing and the end cap, said sealing means including a compressible lower end seal between the annular lower end of the cage and the bottom of the housing and an upper end seal between the annular upper end of the cage and the end cap, said upper end seal and end cap being operative upon closure of said end cap to capture and seal the open end of the bag filter along the annular upper end of the cage.

2. The apparatus as set forth in claim 1 wherein the annular upper end of the cage includes a flat annular sealing surface, and the end cap includes a sharp-edged annular sealing ring which operatively engages the sealing surface upon end cap closure.

3. The apparatus as set forth in claim 2 wherein the flexible annular end sleeve of the bag filter is draped over the annular upper end of the cage and captured between the sealing surface and the sealing ring.

4. The apparatus as set forth in claim 2 wherein the annular upper end of the cage includes a downwardly stepped shoulder defining an annular supporting surface radially inwardly of said sealing surface, and a portion of the annular shape-retaining lip of the bag filter is captured between the supporting surface and the end cap.

5. The apparatus as set forth in claim 2 wherein said annular sealing ring comprises a V-shaped bead.

6. The apparatus as set forth in claim 1 wherein the bottom of the housing includes integral annular rib means coaxially disposed therein, the lower end of the cage includes a lower annular sealing surface, and said compressible lower end seal comprises a rubber ring between said annular rib means and said lower annular sealing surface.

7. The apparatus as set forth in claim 3 wherein said end cap includes an annular downwardly depending skirt radially outside said sealing ring and adapted to shroud a portion of the filter bag end sleeve outside the cage.

8. The apparatus as set forth in claim 1 wherein said bag filter comprises a generally cylindrical body of filter media material, and a closed lower end defined by a rigid annular end cap.

9. The apparatus as defined in claim 4 wherein the bag filter is of the type having a shape-retaining lip, said lip comprising:

a flange having upper and lower flat annular surfaces, said lower surface being upwardly stepped to define with said upper annular surface a rigid inner portion adapted to rest on said supporting surface and an upper portion defining with said upper annular surface a thin annular peripheral edge portion disposed between said sealing surface and said sealing ring.

10. The apparatus as set forth in claim 9 including an annular gasket attached to the upper flat annular surface of said flange.

11. The apparatus as set forth in claim 4 wherein the portion of said annular shape-retaining lip captured between the supporting surface and the end cap comprises a cross section having the shape of an inverted V.

* * * * *